United States Patent [19]

Sliger

[11] 4,171,767

[45] Oct. 23, 1979

[54] ENGINE COOLING SYSTEM THERMOSTAT AND METHOD OF MAKING THE SAME

[75] Inventor: Boyd P. Sliger, Concord, Tenn.

[73] Assignee: Robertshaw Controls Company, Richmond, Va.

[21] Appl. No.: 886,536

[22] Filed: Mar. 14, 1978

Related U.S. Application Data

[62] Division of Ser. No. 688,751, May 21, 1976, Pat. No. 4,091,991.

[51] Int. Cl.² ............................................. F01P 7/02
[52] U.S. Cl. .............................. 236/34.5; 137/513.5
[58] Field of Search ........................... 236/34.5, 34; 137/513.5

[56] References Cited

U.S. PATENT DOCUMENTS

| 1,015,142 | 1/1912 | Criswell | 137/513.5 X |
| 2,086,360 | 7/1937 | Hill | 123/41.08 X |
| 2,810,524 | 10/1957 | Puster | 236/34 |
| 3,698,418 | 10/1972 | Schmitt | 137/315 |
| 3,973,729 | 8/1976 | Sliger | 236/34.5 |

Primary Examiner—William F. O'Dea
Assistant Examiner—William E. Tapolcai, Jr.
Attorney, Agent, or Firm—Candor, Candor & Tassone

[57] ABSTRACT

A vehicle-type thermostat having a housing provided with a valve seat that is controlled by a movable valve member which is interconnected to a temperature responsive device which is carried by the housing, the housing having a positioning arrangement thereon for rotationally orienting the housing in a vehicle engine cooling system whereby the structure of the thermostat can be disposed in a desired rotational position within the engine cooling system.

5 Claims, 5 Drawing Figures

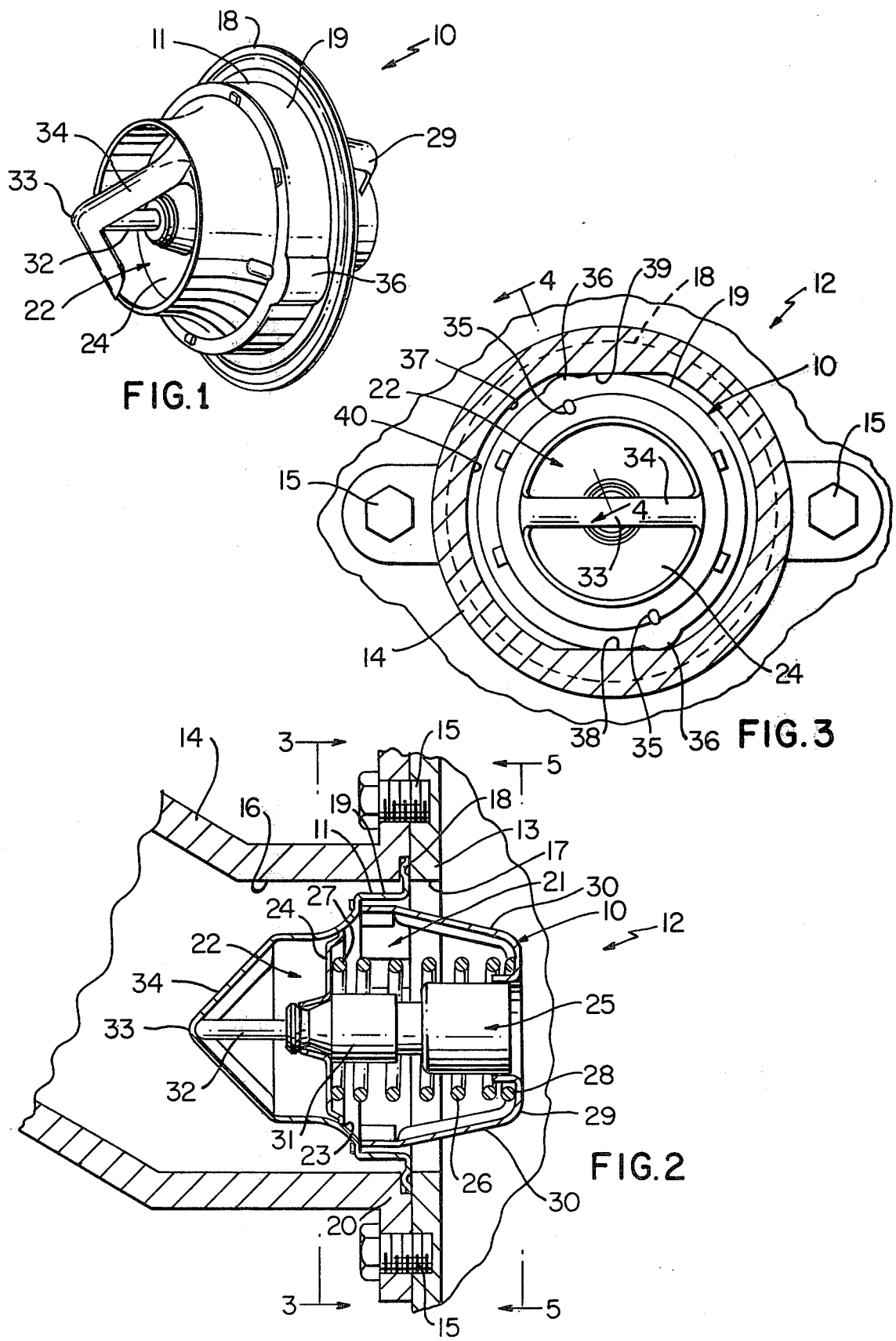

ENGINE COOLING SYSTEM THERMOSTAT AND METHOD OF MAKING THE SAME

This application is a divisional patent application of its copending parent patent application, Ser. No. 688,751, filed May 21, 1976, now U.S. Pat. No. 4,091,991.

This invention relates to an improved vehicle-type thermostat and to an engine cooling system utilizing the same, this invention also being directed to the method of making such a vehicle-type thermostat.

It is well known that automobile type thermostats have each been provided with a leak notch or hole to provide a leak path for the air being displaced by fluid or water as the cooling system of the engine utilizing such thermostat is being filled. If such a leak arrangement is not utilized, the cooling system cannot be filled completely and even with a leak arrangement, air will escape only until the level of the coolant being added reaches the level of the leak notch (or slightly above the same depending on the height of the filler neck above the leak arrangement), at which point the trapped air volume will prevent additional filling.

On some automobile engines, the thermostat is mounted with the center line of the thermostat substantially parallel to the engine crankshaft and thereby is prependicular to the radiator. In this particular engine arrangement, the amount of coolant which can be added during filling is dependent upon the level of which the leak notch in the thermostat happens to be installed. If installed at its uppermost level, a maximum amount of coolant can be added to a level slightly above the leak notch level. If, however, the leak notch happens to be installed at a lower level, a lesser amount of coolant can be added.

Accordingly, it is a feature of this invention to provide a thermostat that will insure that the same will be installed so that there will be a leak notch or leak arrangement located near the uppermost position thereof.

In particular, one embodiment of this invention provides a vehicle type thermostat having a housing means provided with a valve seat which is controlled by a movable valve member which is interconnected to a temperature responsive device which is carried by the housing means, the housing means having the positioning means thereon for rotationally orienting the housing means in a vehicle engine cooling system whereby the thermostat will be disposed in the desired rotational position in the cooling system. For example, the thermostat of this invention can be inserted into an outlet housing of the engine cooling system and be rotated in either direction about a horizontal axis thereof until the positioning means of the thermostat abut against the positioning means of the outlet housing whereby a leak arangement of the thermostat will be disposed substantially near the top or uppermost position thereof for the above described purpose.

Accordingly, it is an object of this invention to provide an improved vehicle-type thermostat having one or more of the novel features set forth above or hereinafter shown or described.

Another object of this invention is to provide an improved vehicle engine cooling system utilizing such a thermostat.

Another object of this invention is to provide a method of making such a thermostat, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a perspective view of the improved vehicle-type thermostat of this invention.

FIG. 2 is a cross-sectional view illustrating the thermostat of FIG. 1 installed in an engine cooling system.

FIG. 3 is a fragmentary, cross-sectional view taken on line 3—3 of FIG. 2.

Figure 4:
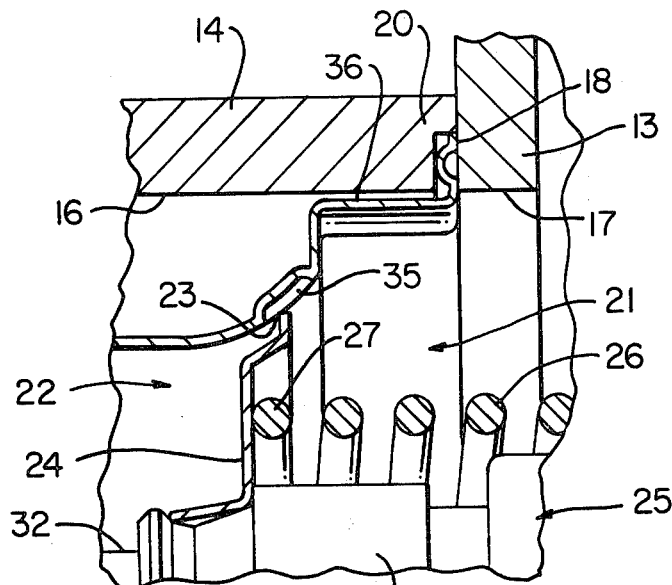
FIG. 4 is an enlarged, fragmentary, cross-sectional view taken on line 4—4 of FIG. 3.

While the various features of this invention are hereinafter described and illustrated as being particularly adapted to position a vehicle-type thermostat in an engine cooling system so as to insure that a leak arrangement of the thermostat is in the uppermost position thereof, it is to be understood that the various features of this invention can be used singly or in any combination thereof to provide a vehicle-type thermostat to be positioned for other purposes as desired.

Therefore, this invention is not to be limited to only the embodiment illustrated in the drawings, because the drawings are merely utilized to illustrate one of the wide variety of uses of this invention.

Referring now to FIGS. 1 and 2, the improved vehicle-type thermostat of this invention is generally indicated by the reference numeral 10 and comprises a housing means 11 adapted to be inserted in an engine cooling system that is generally indicated by the reference numeral 12 in FIG. 2 and comprises a conduit means 13 having an outlet housing 14 secured thereto by fastening bolts 15 so that the passage 16 of the outlet housing 14 is in aligned relation with the opening 17 in the conduit 13.

The housing 11 of the thermostat 10 has an outwardly directed annular flange 18 extending from one end of a cylindrical housing section 19, the annular flange 18 being adapted to be sandwiched between a stepped annular flange 20 of the outlet housing 14 and the conduit 13 so as to completely block the interconnection between the conduit 13 and the outlet housing 14.

However, the housing 11 of the thermostat 10 is provided with an inlet 21 that is adapted to be disposed in fluid communication with the conduit 13 and an outlet 22 that is adapted to be disposed in fluid communication with the passage 16 of the outer housing 14, the housing 11 having an annular valve seat surface 23 in the housing means 11 between the inlet 21 and outlet 22 thereof that is adapted to be opened and closed by a movable valve member 23 carried by a piston and cylinder temperature responsive device that is generally indicated by the reference numeral 25 and is conventional in the art, the valve member 24 being urged to its closed position by a compression spring 26 having one end 27 bearing against the valve member 24 and the other end 28 thereof bearing against a spring retainer 29 interconnected to the housing means 11 by a pair of integral strap members 30.

The piston and cylinder temperature responsive device 25 has its cylinder means 31 carrying the valve member 24 while the piston 32 thereof bears against the apex 33 of a V-shaped strap 34 that is formed integral with the housing means 11 as illustrated whereby upon the heating of a wax charge in the cylinder means 31 to cause the wax charge to expand when the same reaches a certain temperature, the piston and cylinder arrangement 25 causes the cylinder means 31 and, thus, the valve member 24 to move to the right in FIG. 2 in opposition to the force of the compression spring 26 to open the valve seat surface 23 in a manner well known in the art and permit some of the fluid passing through the conduit 13 to be by-passed into the outlet housing 14 and be cooled in the engine radiator before the same is passed back to the cooling system conduit 13 in a mannner well known in the art. Of course, when the temperature being sensed by the device 25 is below the predetermined condition, the wax charge contracts and the compression spring 26 will move the valve member 24 to close the valve seat surface 23 and thereby prevent communication between the conduit 13 and the outlet housing 14.

The housing 11 of the thermostat 10 of this invention is provided with two diametrically disposed leak notches 35 formed in the valve seat surface 23 so as to bridge the valve member 24. When the valve member is disposed in the closed position as illustrated in FIG. 4 whereby each notch 35 provides a leakage path between the inlet 21 and the outlet 22 of the thermostat 11 for air to escape across the closed valve member 24 when coolant or water is being added to the engine cooling system 12 for the reasons previously stated.

Also as previously stated, it has been found according to the teachings of this invention, that it is desirable to always have one of the leak arrangements 35, of the thermostat 10 of this invention located in substantially the uppermost position thereof so that the maximum amount of coolant or water can be added to the system 12 as previously stated because the thermostat 10 is mounted in the horizontal manner illustrated in FIG. 2.

In order to insure that the thermostat 10 will always be mounted in the cooling system 12 with one of the leak notches 35 in substantially the uppermost position thereof, the substantially cylindrical housing section 19 of the thermostat 10 is provided with a pair of integral outwardly directed diametrically opposed abutments or positioning means 36 which are substantially semi-circular in cross-section, such abutments 36 being located on substantially the same diameter on which the diametrically opposed leak notches 35 are located in the manner illustrated in FIG. 3.

The outlet housing 14 has the passage 16 provided with a substantially elliptical cross section or opening 37 adjacent the flange 20 thereof as illustrated in FIG. 3 wherein the horizontal diameter of the elliptical opening 37 is the largest diameter of the opening 37 while the vertical diameter of the opening 37 is the smallest diameter of the elliptical opening 37. In this manner, two pairs of diametrically opposed abutment surfaces 38 and 39 are formed on the internal peripheral force of the elliptical opening 37 which will cooperate with the abutment means 36 of the housing 11 of the thermostat 10 in a manner now to be described, the length of the diameter for each pair of abutment surfaces 38 and 39 being intermediate the largest and smallest diameters of the opening 37.

When the thermostat 10 is initially to be disposed in the engine cooling system 12, the outlet housing 14 is unfastened from the conduit 13 through the removal of the bolts 15. The thermostat 10 is then inserted into the elliptical opening 37 of the outlet housing 14 with the abutment means 36 being located generally on the larger diameter of the opening 37 and then the thermostat 10 is rotated in either a clockwise or counterclockwise direction until the abutments 36 thereof abut into interference with the positioning surfaces 38 or 39 of the outlet housing 14 as the case may be, FIG. 3 illustrating the abutments 36 having been rotated in a clockwise direction to interfere with the positioning surfaces 38 whereby one of the leak notches 35 is disposed in substantially the uppermost position thereof as illustrated. Thereafter, the outlet housing 14 is then resecured to the conduit 13 by the fastening bolts 15 whereby the thermostat 10 will be clamped and held in the rotational position of FIG. 3 for the reasons previously set forth.

Therefore, it can be seen that in order for the thermostat 10 to be inserted into the elliptical opening 37 of the outlet housing 14, the abutments 36 of the housing 11 must be inserted somewhere inbetween the largest diameter of the elliptical opening 37 and the diameter of the positioning surfaces 38 and 39 and once the thermostat is so inserted, the thermostat 10 is merely rotated in a clockwise or counterclockwise direction to properly position the thermostat 10 so that one of leak arrangements 35 thereof will be in substantially the uppermost position thereof for the purpose previously set forth.

While the thermostat 10 has been previously described as utilizing the positioning abutments 36 thereof to position the leak arrangements 35 relative to the outlet housing 14, it is to be understood that other structural features of the thermostat 11 can be so positioned.

For example, in many engines the inlet water to the thermostat 10 is directed perpendicular to the center line of the thermostat 10 and in such arrangements, it is possible to ensure that the spring straps 30 that retain the spring 26 will be oriented so that the flow does not directly impinge into the straps legs 30 and thereby provide a restriction in the flow.

Figure 5:
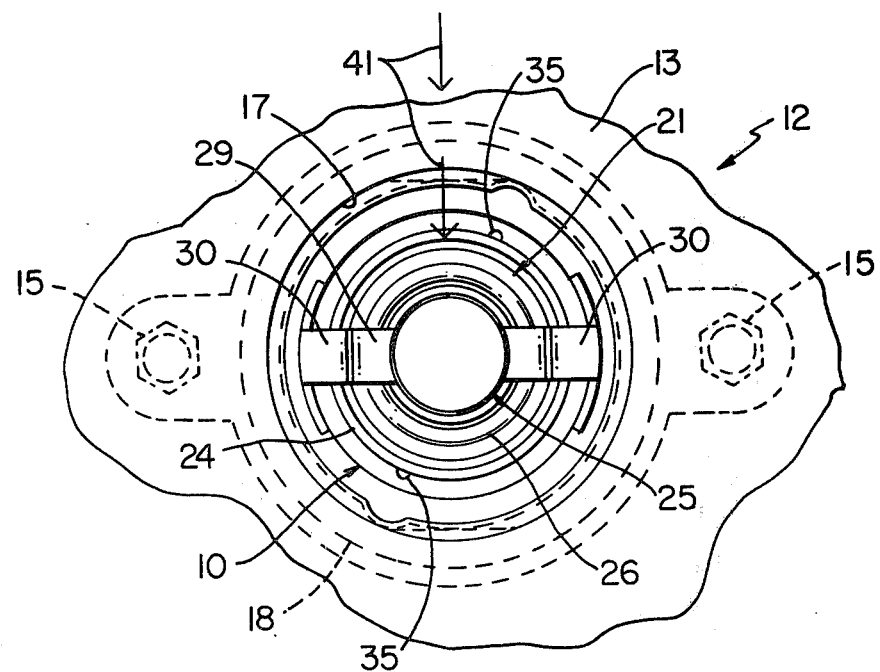
FIG. 5 is a fragmentary, cross-sectional view taken on line 5—5 of FIG. 2.

In particular, it can be seen that by placing the straps 30 in a predetermined position relative to the positioning means 36, the position of the straps 30 can be aligned in a position for maximum fluid flow to the thermostat 10 in the manner illustrated in FIG. 5 wherein the normal flow of the cooling fluid is represented by the arrows 41 and the straps 30 are disposed on a center line of the thermostat 10 that is generally perpendicular to such fluid flow 41 by the positioning means 36 cooperating with the positioning means 38 or 39 of the outlet housing 14 in the manner previously described.

In a like manner, the bridge or abutment means 34 on the downstream side of the thermostat could be aligned in a position to allow maximum flow in those applications in which the flow outlet configurations makes an abrupt change in direction.

Therefore, it can be seen that other structural features of the thermostat 10 could be properly oriented relative to the structural means of the engine cooling system 12 through the proper use of the positioning means 36, 38 and 39 in the manner previously described.

While the positioning means 36 of the thermostat 10 are illustrated as being on the cylindrical section 19 of the housing means 11, it is to be understood that the positioning means 36 could be located on the annular flange 18 thereof and the elliptical opening 37 of the outlet housing 14 could be merely provided in the stepped flange 20 with such elliptical opening 37 and positioning means 36 functioning in the same manner to rotationally position the thermostat in the outlet housing 14 for the reasons previously set forth.

Therefore, it can be seen that this invention not only provides an improved vehicle-type thermostat and engine cooling system utilizing the same, but also this invention provides an improved method of making such a thermostat or the like.

While the form and method of this invention now preferred have been illustrated and described as required by the Patent Statute, it is to be understood that other forms and method steps can be utilized and still fall within the scope of the appended claims.

What is claimed is:

1. In a method of making a vehicle type thermostat having a housing means provided with a valve seat that is controlled by a movable valve member which is interconnected to a temperature responsive device that is carried by said housing means, said thermostat having leak means to provide a leak path for air being displaced by coolant being added to said cooling system, the improvement comprising the steps of forming said housing means with positioning means thereon for rotationally orienting said housing means in a vehicle engine cooling system whereby said thermostat can be disposed in the desired rotational position in said cooling system, and forming said leak means to comprise two diametrically disposed leak paths in said housing means whereby said positioning means assures that one of said leak paths will be disposed near the top of said housing means when said housing means is positioned by said positioning means in said cooling system.

2. A method of making a vehicle type thermostat as set forth in claim 1 and including the step of forming said positioning means as a pair of diametrically disposed abutments on said housing means.

3. A method of making a vehicle type thermostat as set forth in claim 2 and including the steps of forming said housing means with a substantially cylindrical section, and forming said abutments to be integral with said section and each being substantially semi-circular in cross section.

4. A method of making a vehicle type thermostat as set forth in claim 1 and including the steps of forming said housing means with strap means that will be located near the inlet of said cooling system to said thermostat, and forming said positioning means to assure that said strap means will be in the least inlet flow restriction position thereof when said housing means is positioned by said positioning means in said cooling system.

5. A method of making a vehicle type thermostat as set forth in claim 2 and including the step of forming said positioning means so that said housing means can be inserted into an outlet housing of the engine cooling system and be rotated until said positioning means of said housing means abut with positioning means of said outlet housing to thereby orient said thermostat in said engine cooling system.

* * * * *